(12) United States Patent
Giraldin et al.

(10) Patent No.: US 6,424,264 B1
(45) Date of Patent: Jul. 23, 2002

(54) SYSTEM FOR REAL-TIME LOCATION OF PEOPLE IN A FIXED ENVIRONMENT

(75) Inventors: Patrick W. Giraldin, Irvine; Regan E. Kelly, Laguna Niguel; Timothy W. Giraldin, Aliso Viejo, all of CA (US)

(73) Assignee: Safetzone Technologies Corporation, Laguna Hills, CA (US)

( * ) Notice: Subject to any disclaimer, the term of this patent is extended or adjusted under 35 U.S.C. 154(b) by 0 days.

(21) Appl. No.: 09/687,062

(22) Filed: Oct. 12, 2000

(51) Int. Cl.$^7$ .............................................. G08B 23/00
(52) U.S. Cl. ................. 340/573.1; 340/539; 340/573.4; 340/825.49; 340/988
(58) Field of Search ............................. 340/574, 573.1, 340/572.1, 825.49, 995, 988, 990, 10.1, 573.4, 539; 742/42, 44

(56) References Cited

U.S. PATENT DOCUMENTS

| | | | | |
|---|---|---|---|---|
| 4,275,385 A | * | 6/1981 | White ................... 340/825.49 |
| 4,495,496 A | * | 1/1985 | Miller, III ................. 340/10.2 |
| 4,589,275 A | | 7/1986 | Ross ......................... 340/573 |
| 4,998,095 A | * | 3/1991 | Shields ....................... 340/574 |
| 5,317,309 A | | 5/1994 | Vercellotti ............. 340/825.54 |
| 5,596,313 A | | 1/1997 | Berglund ................... 340/574 |
| 5,929,848 A | | 7/1999 | Albukerk ................... 345/326 |
| 5,933,079 A | * | 8/1999 | Frink ......................... 340/539 |
| 5,977,877 A | * | 11/1999 | McCulloch et al. ..... 340/572.8 |
| 5,987,421 A | | 11/1999 | Chuang ......................... 705/7 |
| 6,046,688 A | | 4/2000 | Higashikata ................ 340/995 |
| 6,057,756 A | * | 5/2000 | Engellenner ................ 340/505 |
| 6,150,921 A | * | 11/2000 | Werb et al. ................. 340/10.1 |

FOREIGN PATENT DOCUMENTS

| JP | 10090387 A | 9/1996 |
|---|---|---|
| JP | 2000111648 A | 4/2000 |

* cited by examiner

*Primary Examiner*—Brent A. Swarthout
(74) *Attorney, Agent, or Firm*—Foley & Lardner; Bernard L. Kleinke

(57) ABSTRACT

A system is provided for tracking in real-time the location of a group of individuals within a defined environment, for providing information to an individual user about the location of any other individuals of the group and for gaining assistance to locate and reunite lost individuals. The system uses an identification Tag with serial identification Tag number worn by each individual of the group, has means for communicating with each Tag as it moves with the individual through the environment and means for using the communication to determine the position of the Tag in the environment. The system also uses strategically placed ID stations distributed within the environment for users to activate a request that the system locate members and for displaying a map indicating the location of members of the group.

30 Claims, 11 Drawing Sheets

FIG. 7
FIG. 8
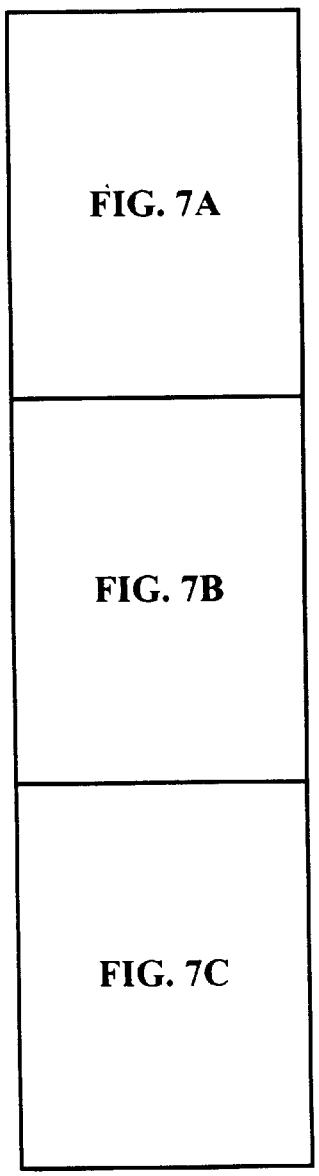
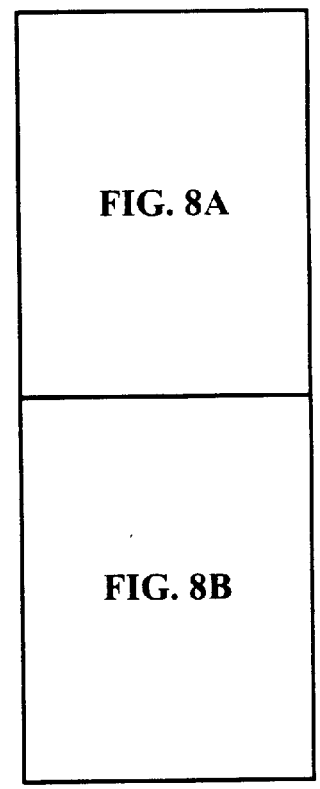

FIG. 7A

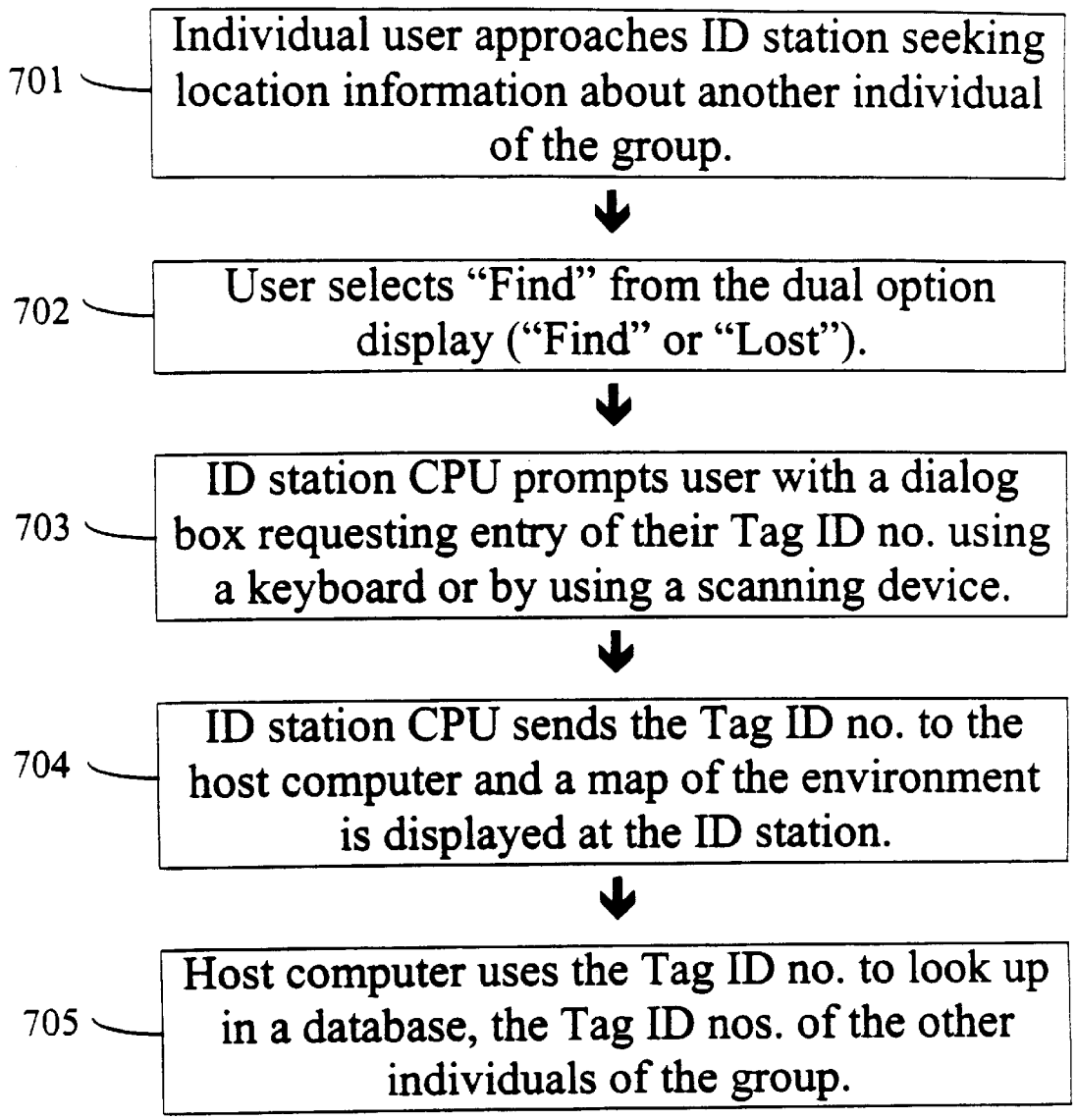

701 — Individual user approaches ID station seeking location information about another individual of the group.

702 — User selects "Find" from the dual option display ("Find" or "Lost").

703 — ID station CPU prompts user with a dialog box requesting entry of their Tag ID no. using a keyboard or by using a scanning device.

704 — ID station CPU sends the Tag ID no. to the host computer and a map of the environment is displayed at the ID station.

705 — Host computer uses the Tag ID no. to look up in a database, the Tag ID nos. of the other individuals of the group.

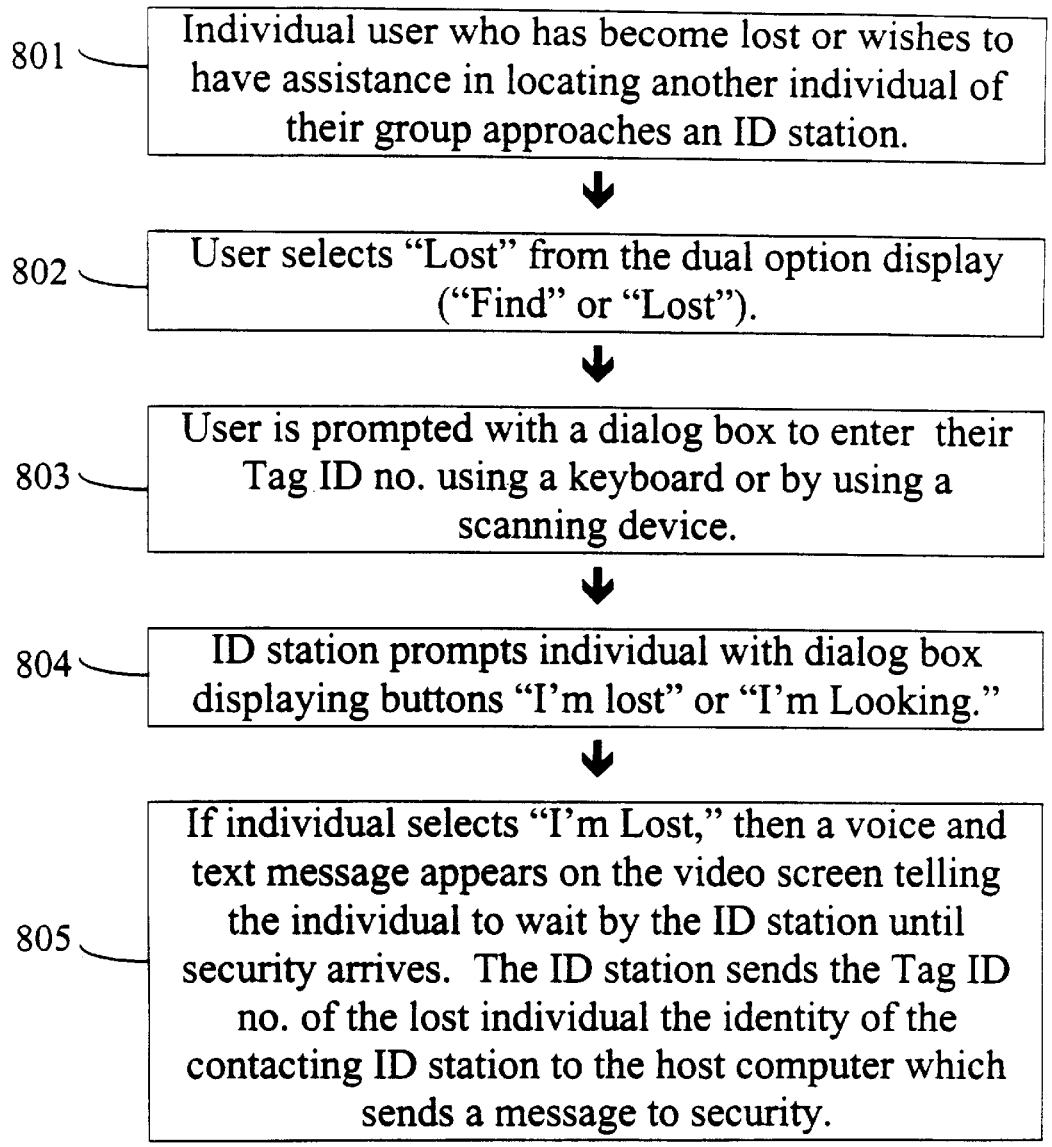

FIG. 8A

801 — Individual user who has become lost or wishes to have assistance in locating another individual of their group approaches an ID station.

802 — User selects "Lost" from the dual option display ("Find" or "Lost").

803 — User is prompted with a dialog box to enter their Tag ID no. using a keyboard or by using a scanning device.

804 — ID station prompts individual with dialog box displaying buttons "I'm lost" or "I'm Looking."

805 — If individual selects "I'm Lost," then a voice and text message appears on the video screen telling the individual to wait by the ID station until security arrives. The ID station sends the Tag ID no. of the lost individual the identity of the contacting ID station to the host computer which sends a message to security.

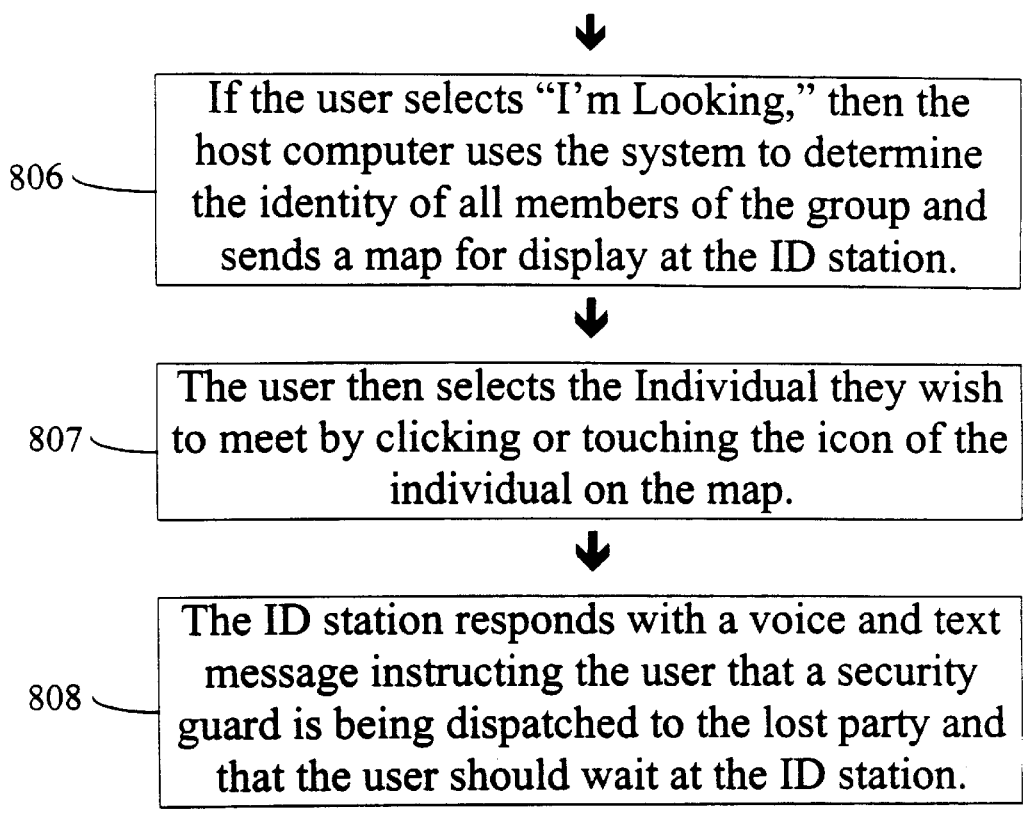

SYSTEM FOR REAL-TIME LOCATION OF PEOPLE IN A FIXED ENVIRONMENT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to tracking systems, and more specifically to track in real time the location of individuals of a group within a defined environment such as a theme park or other such fixed activity environment.

2. Related Art

Systems and equipment necessary for tracking a group of individuals in real-time within a defined environment such as a theme park provide several challenges. The system should be able to distinguish every individual in the park and separately track their movement continuously or as needed within the environment and ideally should be able to locate members of the group within seconds of separation if either becomes lost or separated. For this purpose, the system should provide convenient access anywhere within the environment no matter how large and should operate effectively regardless of the extent of crowding. The system also should be accurate and provide updates on location every second or so as desired. This is particularly important in tracking fast moving children who become separated from their parents.

Systems and equipment for tracking the location of moving objects such as people in real time have been described (see, e.g., U.S. Pat. Nos. 5,764,283 and 5,973,732), however, the inventor is not aware of any description that satisfies the requirements discussed above. Many prior systems are based on tracking by comparing video frames taken at different times. A video directed approach, however, is suited only for tracking individuals in a very limited space such as the threshold of a store. Systems that use a tagging device attached to the individual for communication via radio frequency transmission and receipt also have been described, however, such devices are used primarily for controlling portal entry to a secured area.

Thus, it would be useful to have a system and equipment for tracking individuals of a group in real time within a confined environment and to provide information to any of the group members as to the whereabouts of the other members of the group. Such system would be advantageous particularly in large areas such as theme parks, casinos, and the like.

SUMMARY OF THE INVENTION

Without intending to limit in any manner the true spirit or scope of the present invention, the present system briefly described includes a user identification Tag worn by each individual of the group, has means for communicating with each Tag as it moves with the individual through the environment and means for using the communication to determine the position of the Tag in the environment. The system also uses strategically placed ID stations distributed within the environment for users to activate a request that the system locate members of the group or obtain help in assisting lost individuals. Other advantages and various embodiments of the invention follow.

BRIEF DESCRIPTION OF THE DRAWINGS

The various features and advantages of the present invention will become more clearly appreciated as a detailed description of the preferred embodiment is given with reference to the appended drawings in which;

FIGS. 7A, 7B and 7C when arranged as shown in FIG. 7 are a flow chart describing the flow of information from the ID station to the host computer when an individual selects the "Find" button at the ID station display;

FIGS. 8A and 8B when arranged as shown in FIG. 8 are a flow chart describing the flow of information from the ID station to the host computer when an individual selects the "Lost" button at the ID station display.

DETAILED DESCRIPTION OF THE PREFERRED EMBODIMENTS

The present invention provides a system for tracking in real-time the location of a group of individuals within a defined environment and providing individuals of the group with the ability to locate any other individuals of the group. In general, the method includes: (a) an identification Tag worn by each individual of the group; (b) means for communicating with each. Tag as it moves with the individual through the environment and means for using the communication to determine the position of the Tag in the environment; (c) ID stations distributed within the environment, the stations providing a "Locate" button or other means for activating a request that the system locate members of the group; (d) means for receiving the activation request from each location and for generating a map showing the location of each group member on the map; and (e) means for displaying the map at the ID station.

Briefly, an individual who carries ID Tag and is interested in determining the location of another individual of the group approaches an ID station which acts as a kiosk for participants of the system. The individual user provides the system with his/her Tag Serial ID no. which activates a search to retrieve the Tag information, along with all other Tags in the cluster (i.e., the group) and locate the position of each Tag in the environment. This is accomplished by sending Tag ID nos. to the cell controllers which send out a radio signal containing the Tag ID number through a monitoring site and antenna. The person wearing the proper ID Tag no. receives the signal and the Tag responds with a radio signal (at different frequency from that first sent) that includes the ID Tag number. The signal is received at the monitoring sites and relayed to the cell controllers. A Tag to antenna distance based on the time between sending the signal and receiving the signal from the Tag is calculated and used to determine the location of each individual in the environment. This information is sent to the ID station which displays the location of each individual on a map. Further details and various other embodiments of the present system are provided in FIGS. 1–8 as discussed below.

Figure 1:
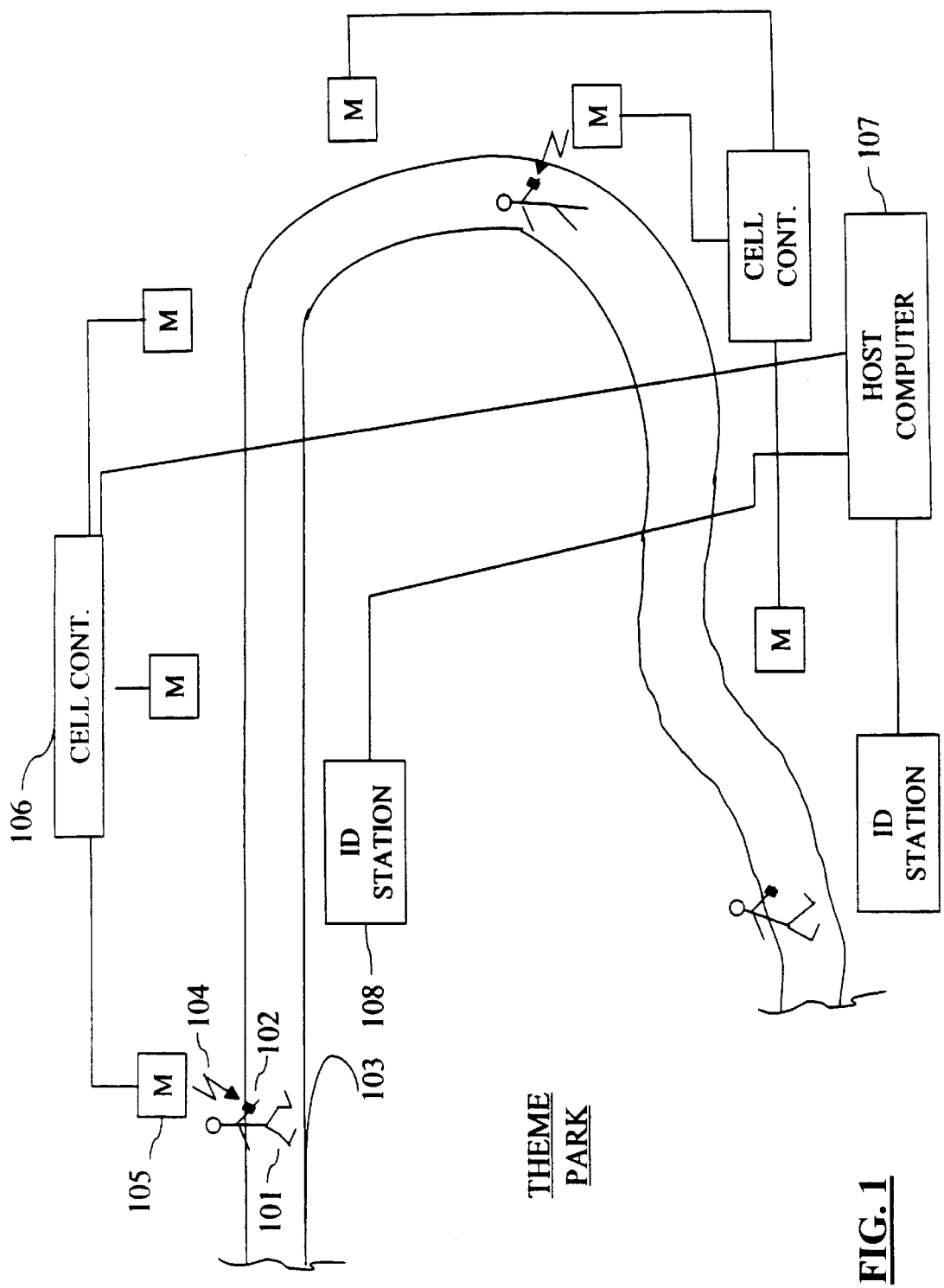
FIG. 1 is a diagrammatic view of the tracking system of the present invention showing the location of monitoring sites, cell controllers ("cell cont."), host computer, ID stations and Tags and an example of communication therebetween.

FIG. 1 is a diagrammatic view of an embodiment of the tracking system as applied to theme park. Individual 101 with identification Tag 102 walking on path 103 in the park comes in contact with radio signal 104 sent by antenna at monitoring site 105. Identification Tag 102 responds with radio signal (not shown) that is received by monitoring site 105 that communicates with cell controller 106. The cell controller 106 communicates with host computer 107, which communicates with ID station 108.

ID stations act as a kiosk for tagged users of the system to access and use its service properties. ID stations are strategically placed in the environment to provide ready access by ID Tag users. The ID station has a CPU and graphical user interface ("GUI"), preferably a touch screen monitor. The ID station provides the user with the ability to locate and view any Tag in the group, to post messages on a private message board or to contact security.

Suggested platform requirements of the ID station include:
 ViewPoint 2.0 with Service Pack 3
 Win 95
 Win 98
 NT 4 (Service Pack 5)
 Win 2000

Suggested minimum hardware requirements of the ID station include:
 233 Pentium III with 128 M RAM
 800 by 600 resolution Tags suitable for use in the system of the invention are well known in the art and are available commercially such as the "3-D-Id" Tag system sold by Pinpoint Corporation, having a place of business at Billerica, Mass. Such Tags can receive spread spectrum radio signals from monitoring site antennas and respond with a signal that includes the Tag Serial ID Number. The Tag can be read at long ranges compared to conventional Radio Frequency Identification ("RFID") systems. The Tags are worn on the person preferably with a safety latch to impede easy removal.

Tags are provided to each participating member of a group when they arrive at the environment. Each individual is given an individual ID Tag with its unique Serial ID no. The ID Tag no. as well as the ID Tag nos. of the other members of the group are stored in the host computer or a server connected thereto. In a preferred embodiment, a digital picture is taken of the individual and stored in the computer along with the Tag number of the individual. The software of the host computer stores each ID Tag no. with a link or in a table with all the other ID Tag numbers of the group.

Figure 2:
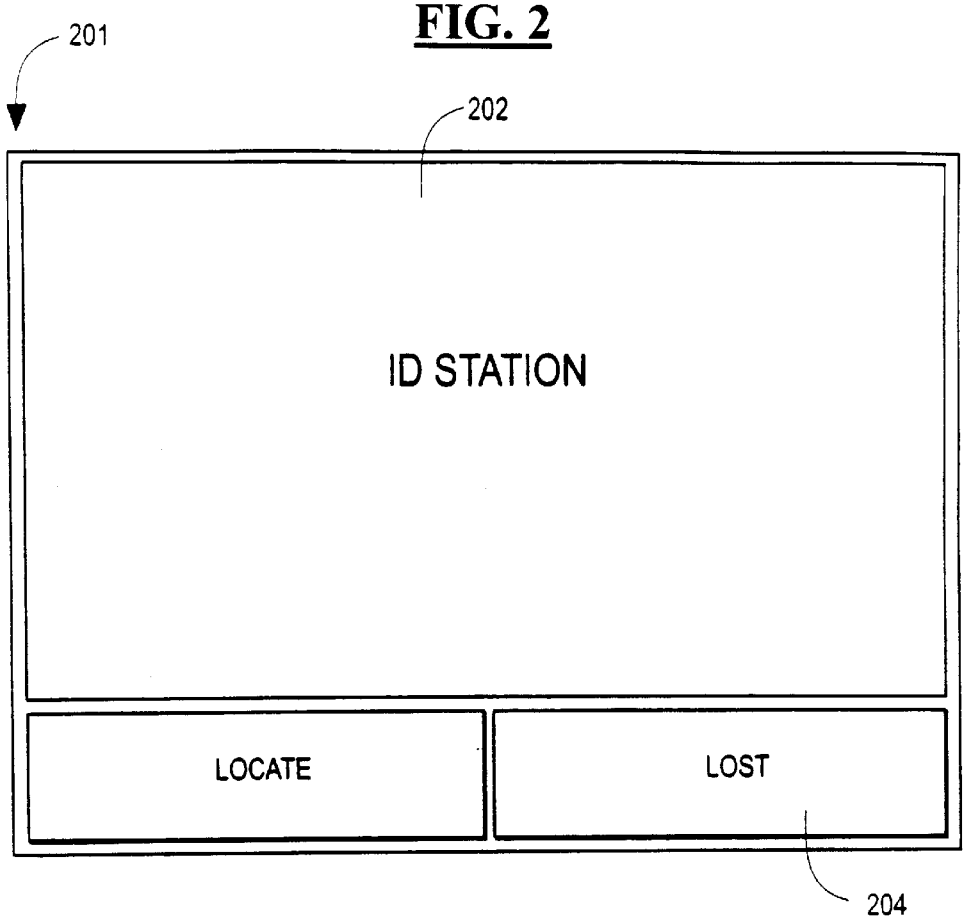
FIG. 2 is a diagrammatic of a graphical user interface ("GUI") showing a video screen (under name of the tracking product) and buttons labeled with "Find" and "Lost" situated below the video display.

FIG. 2 is a schematic of a graphical user interface ("GUI") 201 provided at each ID station for communication between the host computer and the individual user requesting location information. The GUI includes a large video screen 202 showing an opening screen that is displayed when the ID station is not in use. The opening screen may include the trade name of the product which is exemplified by the name "ID stations" shown in FIG. 2. "Locate" button 203 and "Lost" button 204 are shown below the video screen. These are "soft" buttons that are activated by pointing and clicking with a mouse or by use of a "touch screen." An alternative embodiment uses "hard" buttons that can be physically depressed by the individual user. When approaching the GUI, the individual user will select one of the two buttons before providing information on the identification of the individual.

Figure 3:
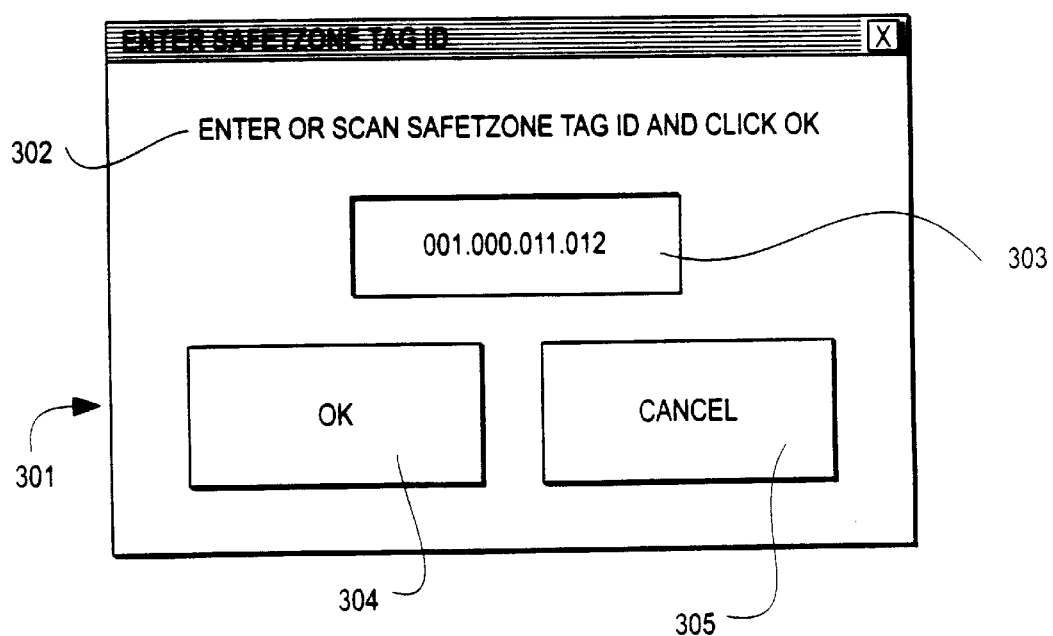
FIG. 3 depicts a dialog box that is displayed on the video GUI of the ID station, showing the entered Tag Serial ID no. and buttons for confirming or canceling the entry.

FIG. 3 depicts dialog box 301 displayed on the video GUI of the ID station following the user selection of either the Locate or Lost buttons. The dialog box includes prompt 302 requesting entry of the Tag ID number or scanning of the Tag ID, display 303 shows the identification number entered or scanned. Actuation of the "OK" button 304 completes the action while actuation of the "cancel" button deletes the dialog box. These are preferably soft buttons that can be selected using mouse or by a touch screen.

Figure 4:
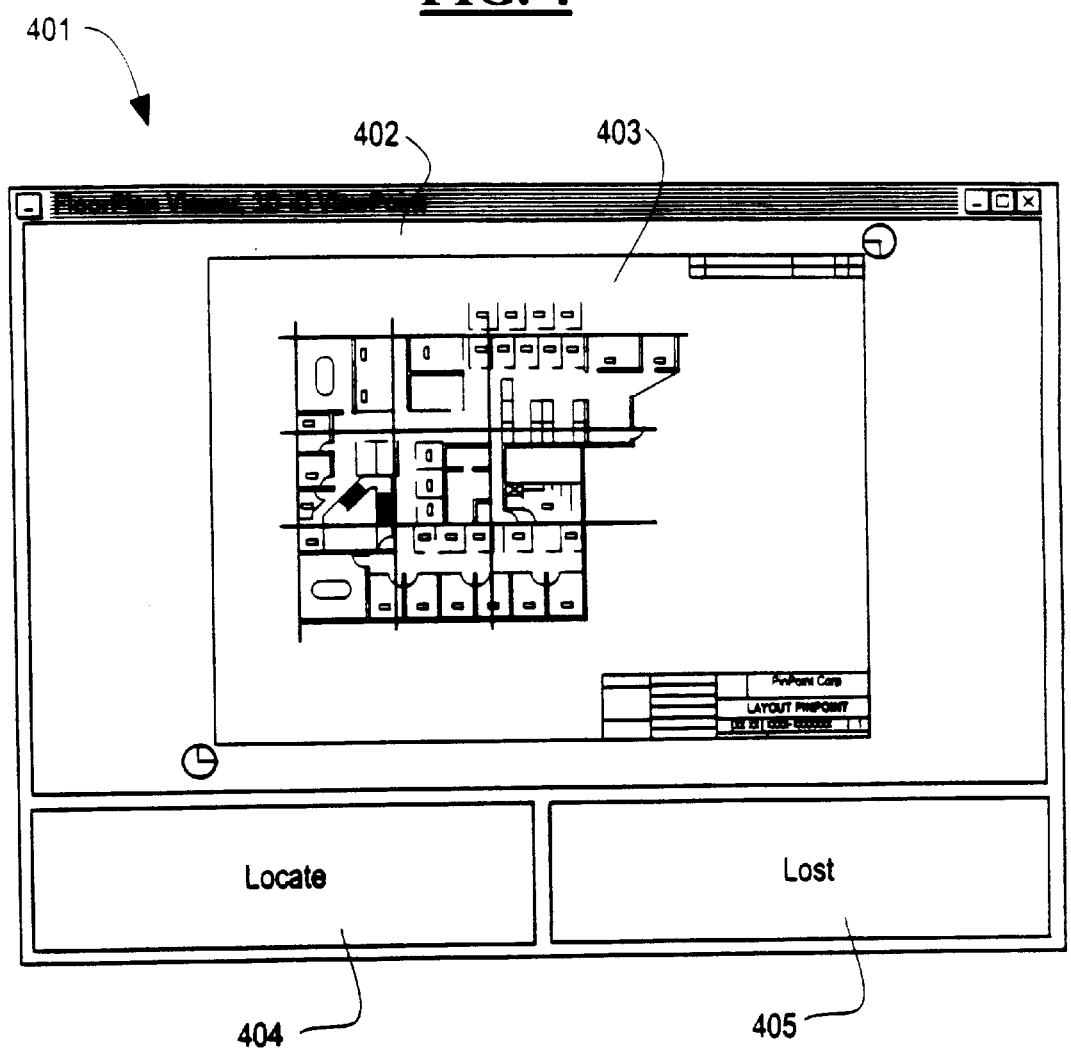
FIG. 4 depicts a dialog box that is displayed on the video GUI of the ID station, providing buttons for indicating whether the user is lost or whether the user is looking for another individual of the group.

FIG. 4 depicts the GUI video display 401 of the ID station. The GUI includes a large video screen 402 with map 403 of the environment where tracking is occurring. "Locate" button 404 and "Lost" button 405 are located below the video screen. As the system identifies the location of individuals of the group, an icon with a picture of the individuals is displayed on the map at their location. In an alternative embodiment, the picture can be replaced by symbol and the GUI can display a key that links the symbol with the name or picture of the individual.

Figure 5:
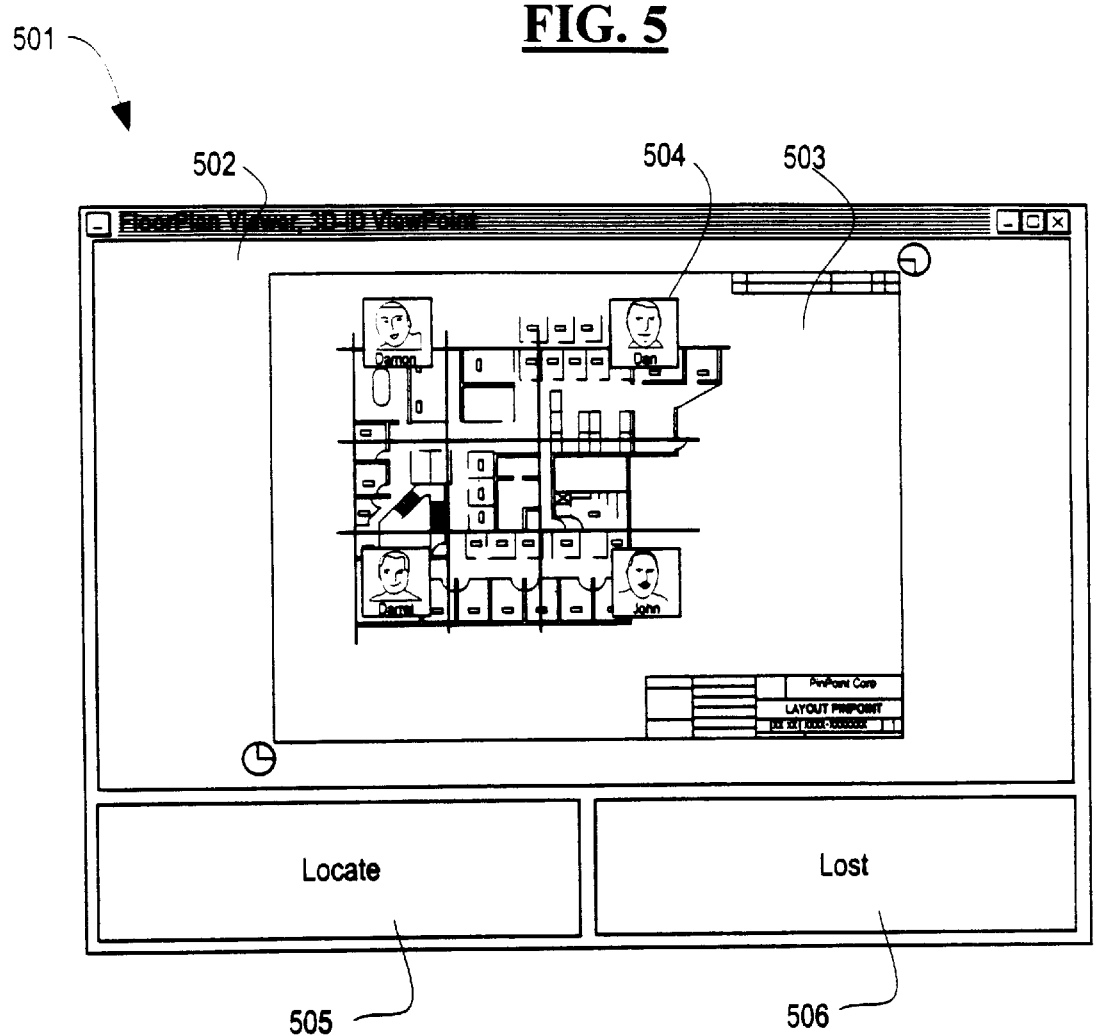
FIG. 5 depicts the GUI video display of the ID station showing an example of a map of an environment covered by the tracking system.

FIG. 5 depicts the GUI video display 501 of the ID station. The GUI includes a large video screen 502 with map 503 of the environment where tracking is occurring showing the identities and location of individuals 504 on the map. "Locate" button 504 and "Lost" button 505 are shown below the large video display.

Figure 6:
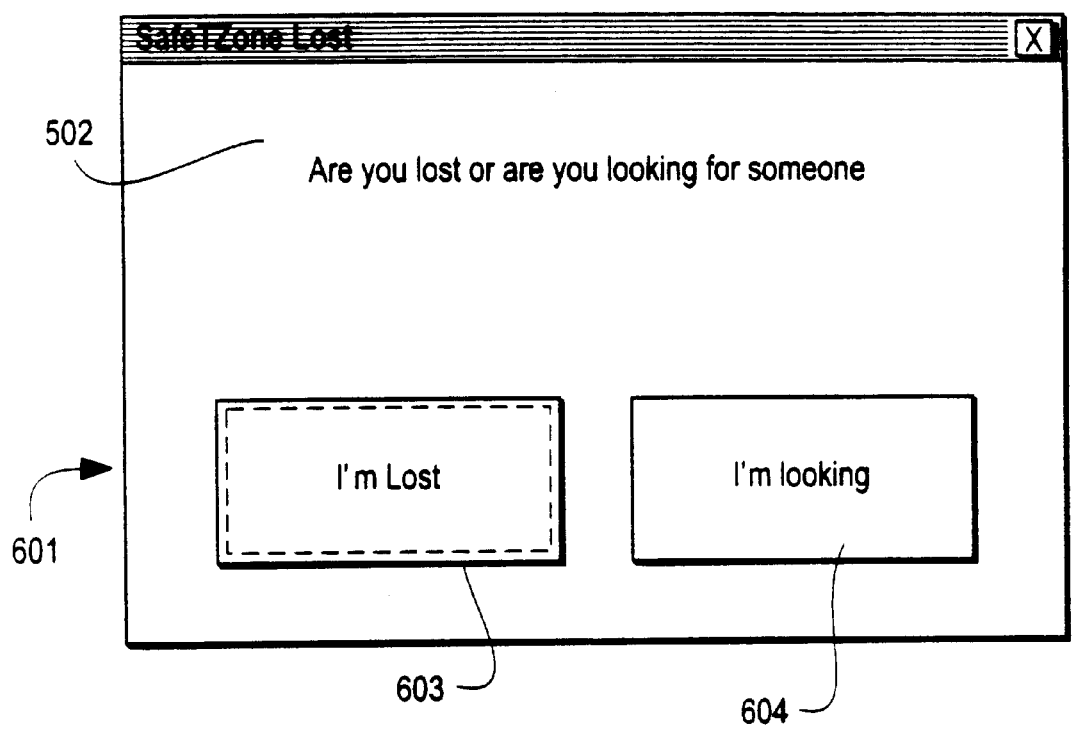
FIG. 6 depicts the GUI video display of the ID station showing an example of a map of an environment indicating the locations of individual members of a group on the map by a picture of the individual.

FIG. 6 depicts a dialog box 301 displayed on the video GUI of the ID station when the user selects the "Lost" button. The box includes prompt 602 requesting the individual to decide if he/she is looking for someone or is lost. Actuation of the "I'm Lost" button 603 prompts the individual to stay put and sends for security. Actuation of the "I'm looking" button 604 activates the process to obtain assistance in meeting an individual of the group as described in more detail in FIG. 7.

Figure 7B:
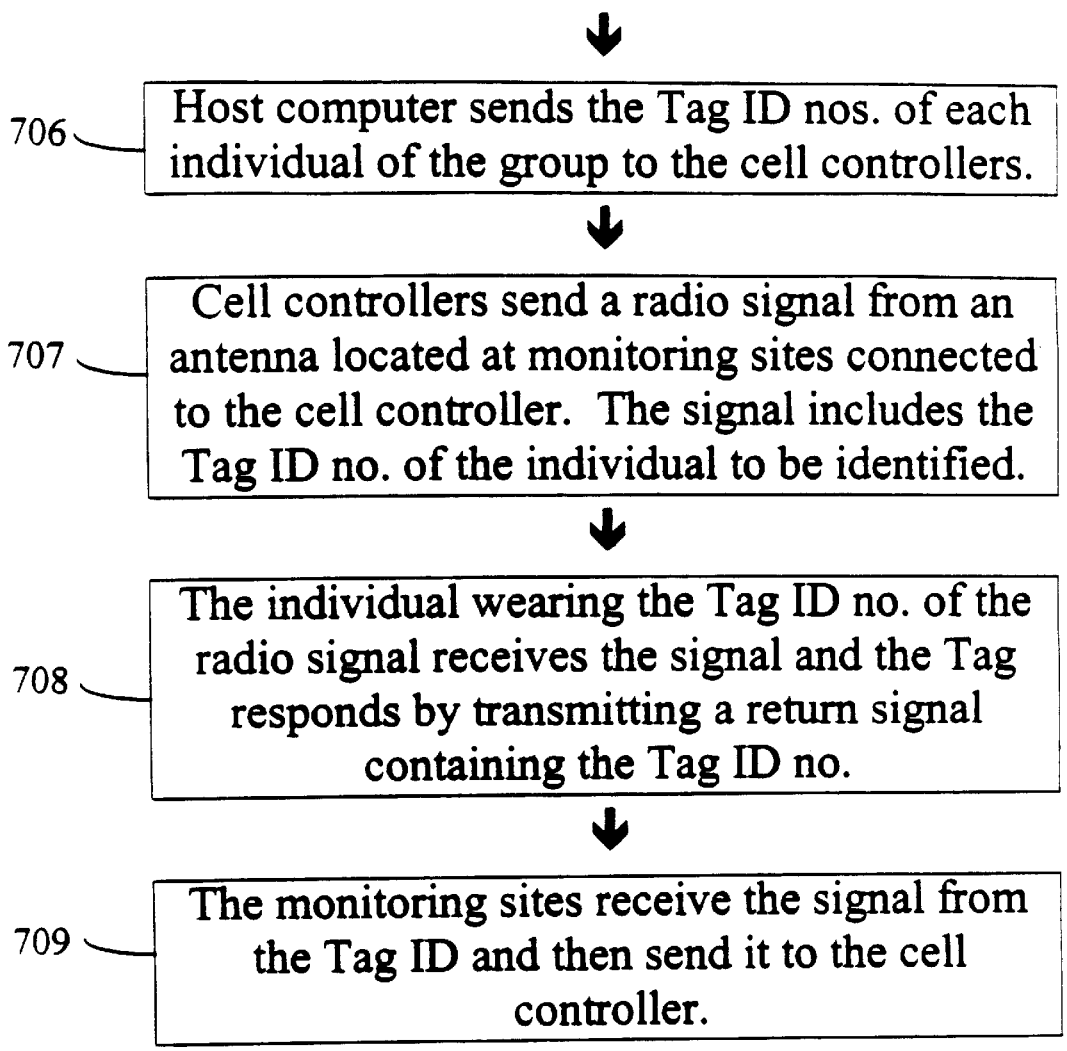
Figure 7C:
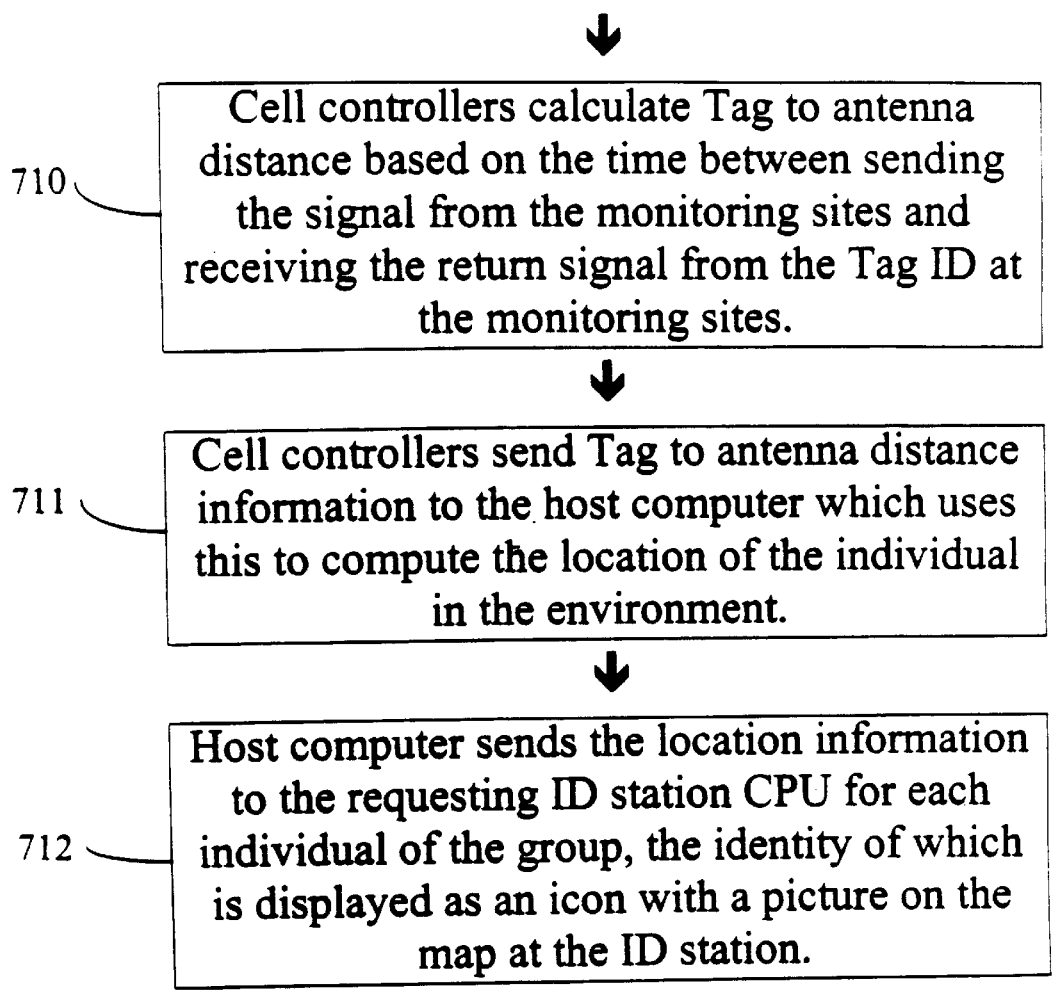

FIG. 7 is a flow chart describing the flow of information from the ID station to the host computer when an individual user selects the "Locate" button at the ID station display. The user approaches the ID station seeking location information about a member of their group (shown as 701) and selects the "Locate" button from the dual option display (shown as 702) of the GUI at the ID station. The ID station prompts the user with a dialog box (see e.g., FIG. 3) requesting entry of their Tag ID number using a keyboard or using a scanning device (shown as 703). The scanning device is preferably a bar code scanner.

The ID station CPU sends the user Tag Serial ID no. to the host computer (shown as 704) which uses the Tag Serial ID no. to look up Tag ID nos. of the other members of the group (shown as 705). The ID station then displays a bit map of the environment which is supplemented later by the information showing the location of individuals of the group. In an alternative embodiment, the bit map is displayed only with the location of the individuals of the group.

The host computer then sends the Tag ID nos. of each individual of the group to the cell controller CPU (shown as 706) which then sends out a radio signal with the Tag Serial ID no. for each individual from the antenna of each connected monitoring site (shown as 707). The individual wearing the Tag Serial ID no. for the radio signal receives the signal and the Tag responds by transmitting a return signal containing the Tag Serial ID no. (shown as 708). The Tags receive the radio signal at one frequency and the signal is returned by the transmitter in the Tag at a different frequency.

The monitoring sites receive the return signal which is sent to the cell controller CPU (shown as 709), which calculates a Tag to antenna distance ("TAD") based on the time between sending the signal from the antenna and receiving a return signal from the Tag (shown as 710). The TAD data elements are the fundamental building blocks of the tracking system. In an alternative embodiment, TAD data is calculated at the host computer. Cell controllers with monitoring sites and antennas are well known in the art and are available commercially such as the "Local Positioning System (LPS) cell controller system sold by Pinpoint Corporation, having a place of business at Billerica, Mass.

Cell controllers send the TAD distance information to the main server which computes the location of the Tag Serial ID no. in the environment (shown as 711). The host computer then sends the location information of each individual to the requesting ID station CPU which displays a map showing the location of each individual of the group as an icon with their picture (shown as 712). The map is displayed for about one to two minutes before reverting to the opening screen. The map will be removed earlier if a user selects the "Locate" or "Lost" buttons. The system can be fine tuned to provide an accuracy of 10 feet or less and can update the location within seconds.

FIG. 8 is a flow chart describing the flow of information from the ID station to the host computer when an individual selects the "Lost" button at the ID station display. The individual user who becomes lost or is seeking assistance in meeting with another individual of the group approaches an ID station (shown as 801) and selects the "Lost" button from the option display (shown as 802). The ID station prompts the user with a dialog box (see e.g. FIG. 3) requesting entry of their Tag Serial ID no. using a keyboard or by using a scanning device (shown as 803).

The ID station then prompts the individual with a second dialog box (see, e.g. FIG. 6) displaying buttons "I'm Lost" or "I'm Looking." If the individual selects the "I'm Lost" button, then the ID station displays a third dialog box (see e.g. FIG. 6) that asks the individual to confirm that they are lost or just looking to meet another individual ("I'm lost" or "I'm Looking") (shown as 804). If the user selects "Lost," the system will instruct the lost user in accordance with the procedures and guidelines of the facility as to how to proceed in this situation. This may include display of a text message and audio message that both of which tell the user to wait by the ID station until security arrives (shown as 805). The host computer preferably simultaneously alerts security by providing the identity of the contacting ID station and the Tag serial number of the lost individual (shown as 805).

If the user selects "I'm Looking," then the host computer uses the system as described and shown for FIG. 7 to determine the identity of all members of the group and sends a map for display at the ID station (shown as 806). The user then selects the individual they wish to meet by clicking or touching the icon of the appropriate individual on the map (shown as 807). The ID station responds with a voice and text message instructing the user that a security guard is being dispatched to the lost party and that the user should wait at the ID station (shown as 808).

The present system can be used to improve safety of children particularly at large facilities such as theme parks or casinos because it can locate children, parents and even employees on a real time basis. These and other benefits include:

Safer environment for children which gives parents peace of mind during their visit.

Allows patrons access to the system and its information and the ability to locate a person quickly and easily through the ID stations. This saves valuable time, effort and energy.

Provides authorities with the ability to determine quickly if a patron has wrongly entered a restricted area.

Useful to track individuals in a large group (e groups of tourists or large parties) who often separate from one another during their visit. Members of the group can quickly locate other members of their party to meet or in the case of an emergency.

Provides security personnel with the ability to quickly come to the aid of missing children or parents and to assist in reuniting them.

Assists in compliance with regulatory agencies and insurance firms and in lowering insurance premiums Provides data for market research by being able to track the movement of customers in the business.

While the invention has been described with reference to only a limited number of embodiments, it will be appreciated that, given the preceding disclosure and knowledge of the principles upon which the invention is based, be able to make various changes and modifications without departing from the scope of the invention which is limited only by the appended claims.

What is claimed is:

1. A system for tracking in real-time the location of a group of individuals within a defined environment and for providing information to any individuals of the group about the location of any other individuals of the group, comprising:

(a) identification tags having a unique identification tag number carried by each individual of the group, the tags having means for receiving a radio signal and for responding to that signal with a radio signal that includes the identification tag number;

(b) cells controllers distributed throughout the environment having radio transmission and receiving means for sending and receiving a radio signal via one or more monitoring sites, each site having an antenna for sending and receiving the signals;

(c) means for computing a tag to antenna distance based on the time between sending the signal and receiving the signal from the tag;

(d) a host computer for storing identification tag numbers with the identity of each individual, the host computer in communication with cell controllers and ID stations, said stations accessible to individuals of the group and distributed throughout the environment and having means for communicating with individuals of the group who visit the station and for obtaining information about the location of individuals of the group, wherein said means for communicating with individuals at the station comprises a display that offers two buttons, one for activating the system to locate an individual and one for indicating that the individual activating the button is lost.

2. A system in accordance with claim 1, wherein each cell controller transmits at a different radio wave frequency.

3. A system in accordance with claim 1, wherein said means for communicating with individuals at the station comprises a computer and a graphical user interface ("GUI").

4. A system in accordance with claim 3, wherein said GUI includes a touch screen video monitor.

5. A system in accordance with claim 1, wherein said environment is selected from the group consisting essentially of theme amusement parks, casinos, hotels, zoos, ski resorts, shopping malls, homes and residences, and neighborhood associations.

6. A system in accordance with claim 1, wherein said means for communicating with individuals at the station includes a keyboard or a bar code scanning device.

7. A system in accordance with claim 1, wherein said means for communicating information about the location of individuals of the group at the ID station comprises the preparation of a map of the environment and display of the map at a video terminal.

8. A system in accordance with claim 7, wherein said displayed map includes different icons or pictures each representing an individual of the group wherein the icons or pictures are located at the position on the map corresponding to the position where the individual is in the environment.

9. A system in accordance with claim 1, wherein said means for communicating information about the location of individuals of the group at the ID station includes a computer generated voice message.

10. A system in accordance with claim 1, further including connection of the host computer or ID station to a security force which is notified when said one of the buttons for indicating that the individual activating the button is lost is selected.

11. A system for tracking in real-time the location of a group of individuals within a defined environment and for providing information to individuals of the group about the location of any other individuals of the group, comprising:
    (a) an identification tag worn by each individual of the group;
    (b) means for communicating with each tag as it moves with the individual through the environment and means for using the communication to determine the position of the tag in the environment;
    (c) ID stations distributed within the environment, said stations providing a "Locate" button or other means for activating a request that the system locate members of the group;
    (d) means for receiving the activation request from an ID station and for generating a map showing the location of each group member on the map; and
    (e) means for displaying the map at the ID station, wherein said means for activating a request that the system locate members of the group includes a keyboard or a bar code scanning device, and wherein said stations further include a "Lost" button which when activated indicates the user is lost or needs assistance to meet an individual of the group.

12. A system in accordance with claim 11, wherein said means for communicating with the tags comprises various cells controllers that transmit via an antenna, a radio signal to the tag which responds by transmitting a radio signal that is received by the antenna of the cell controller.

13. A system in accordance with claim 12, wherein said means for using the communication to determine the position of the tag in the environment comprises a computer for calculating a tag to antenna distance based on the time between sending the signal and receiving the return signal from the tag and for using tag to antenna distances from each cell controller to pinpoint the position of the tag.

14. A system in accordance with claim 11, wherein said means for receiving the activation request from each location and for generating a map showing the location of each group member on the map comprises a host computer.

15. A system in accordance with claim 11, wherein said means for displaying the map at the activation requesting ID station includes a graphical user interface ("GUI").

16. A system in accordance with claim 15, wherein said GUI includes a touch screen video monitor.

17. A system in accordance with claim 11, wherein said map displays different icons or pictures each representing an individual of the group wherein the icons or pictures are located at the position on the map corresponding to the position of the individual in the environment.

18. A system in accordance with claim 11, wherein said environment is selected from the group consisting essentially of theme amusement parks, casinos, hotels, zoos, ski resorts, shopping malls, homes and residences, and neighborhood associations.

19. A system in accordance with claim 11, further including means for obtaining assistance from a security force following activation of the Lost button.

20. A method for tracking in real-time the location of a group of individuals within a defined environment and for providing information to individuals of the group about the location of any other individuals of the group using the system of claim 11.

21. A method for tracking in real-time the location of a group of individuals within a defined environment and for providing information to individuals of the group about the location of any other individuals of the group, comprising:
    (a) providing individuals of the group with identification tags having a unique identification tag number, the tags having means for receiving a radio signal and for responding to that signal with a radio signal that includes the identification tag number;
    (b) locating one or more cells controllers throughout the environment having radio transmission and receiving means for sending and receiving a radio signal via one or more monitoring sites, each site having an antenna for sending and receiving the signals;
    (c) computing a tag to antenna distance based on the time between sending the signal and receiving the signal from the tag;
    (d) using a host computer for storing identification tag numbers with the identity of each individual, the host computer in communication with cell controllers and ID stations, said stations accessible to individuals of the group and distributed throughout the environment and having means for communicating with individuals of the group who visit the station and for obtaining information about the location of individuals of the group, wherein said means for communicating with individuals at the station comprises a display that offers two buttons, one for activating the system to locate an individual and one for indicating that the individual activating the button is lost.

22. A method in accordance with claim 21, wherein each cell controller transmits at a different radio wave frequency.

23. A method in accordance with claim 21, wherein said means for communicating with individuals at the station comprises a computer and a graphical user interface ("GUI").

24. A method in accordance with claim 23, wherein said GUI includes a touch screen video monitor.

25. A method in accordance with claim 21, wherein said environment is selected from the group consisting essentially of theme amusement parks, casinos, hotels, zoos, ski resorts, shopping malls, homes and residences, and neighborhood associations.

26. A method in accordance with claim 21, wherein said means for communicating with individuals at the station includes a keyboard or a bar code scanning device.

27. A method in accordance with claim 21, wherein said means for communicating information about the location of individuals of the group at the ID station comprises the preparation of a map of the environment and display of the map at a video terminal.

28. A method in accordance with claim 27, wherein said displayed map includes different icons for pictures each representing an individual of the group wherein the icons or pictures are located at the position on the map corresponding to the position where the individual is in the environment.

29. A method in accordance with claim 21, wherein said means for communicating information about the location of individuals of the group at the ID station includes a computer generated voice message.

30. A method in accordance with claim 21, further including connection of the host computer or ID station to a security force which is notified when the Lost button is selected.

* * * * *